(12) United States Patent
Bhatti et al.

(10) Patent No.: US 7,936,709 B2
(45) Date of Patent: May 3, 2011

(54) DISTRIBUTED BEACON ENABLED WIRELESS NETWORKS

(75) Inventors: Ghulam Bhatti, Mansfield, MA (US); Zafer Sahinoglu, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 12/362,217

(22) Filed: Jan. 29, 2009

(65) Prior Publication Data

US 2011/0038343 A1    Feb. 17, 2011

Related U.S. Application Data

(60) Provisional application No. 61/078,616, filed on Jul. 7, 2008, provisional application No. 61/037,395, filed on Mar. 18, 2008.

(51) Int. Cl.
*H04J 3/08*  (2006.01)
*H04B 7/212* (2006.01)

(52) U.S. Cl. .................................. 370/326; 370/442
(58) Field of Classification Search .............. 370/326, 370/328, 330, 401, 442, 478
See application file for complete search history.

(56) References Cited

U.S. PATENT DOCUMENTS

| | | | |
|---|---|---|---|
| 7,031,274 B2* | 4/2006 | Sherman | 370/321 |
| 7,088,702 B2* | 8/2006 | Shvodian | 370/348 |
| 7,804,804 B2* | 9/2010 | Sugaya et al. | 370/338 |
| 2006/0067280 A1* | 3/2006 | Howard et al. | 370/337 |
| 2007/0280156 A1* | 12/2007 | Kwon et al. | 370/328 |
| 2009/0103501 A1* | 4/2009 | Farrag et al. | 370/337 |

* cited by examiner

*Primary Examiner* — Hong Cho
(74) *Attorney, Agent, or Firm* — Dirk Brinkman; Gene Vinokur

(57) ABSTRACT

In a wireless network that includes multiple nodes, each periodic announcement cycle of a communication schedule is partitioned into a set of time slots, including a set of management time slots, a set of beacon time slots, and a set of superframe time slots. Management frames are broadcast during the management slot to specify beacons. Beacons are transmitted during the beacon slots to specify when to transmit the superframes during the superframe time slots.

23 Claims, 12 Drawing Sheets

DISTRIBUTED BEACON ENABLED WIRELESS NETWORKS

RELATED APPLICATIONS

This Non-Provisional Application claims priority to U.S. Provisional Application 61/078,616, "Distributed Beacon Enabled Wireless Networks," filed by Bhatti et al. on Jul. 7, 2008; and 61/037,395, "Hybrid Multiple Access Method and System in Wireless Networks with Extended Content Free Access Period," filed by Sahinoglu et al. on Mar. 18, 2008 incorporated herein by reference.

FIELD OF THE INVENTION

This invention relates generally beacon signals in wireless communication networks, and more particularly to networks designed according to the IEEE 802.15.4-2006 standard.

BACKGROUND OF THE INVENTION

Wireless sensor networks (WSN) are deployed in many industrial and commercial environments. Applications in industrial environments offer an enormous business potential for these types of networks. A machine failure can cause large expenses if not detected, when compared to the cost of a systematic shut down of a machine for service well before the machine fails.

However, scalability, reliability, and latency are challenging issues. Wired sensor networks are generally used for such applications due to their high reliability and low latency. Such networks, however, are costly, complex, and inflexible. A change in topology of the network can mean reinstallation of the wired backbone. That can not be cost effective, and can force a prolonged down time.

This leads to a need for a reconfigurable, low cost, and less installation intensive sensor networking technology that satisfies the requirements of industrial applications. A viable solution is to use wireless sensor networks. These networks are both cheap to install and flexible to topological changes due to their relatively simple and fast setup procedures. The challenge, however, lies in providing a similar degree of reliability and latency as offered by their wired networks. Limited resources that are generally available to sensor nodes effectively preclude the use of forward error correction codes or other computationally intensive approaches.

Wireless data networks have been used in diverse environments. Wireless cellular networks, WiFi, Bluetooth, WiMax, and RF, for example, are all well suited to their respective application domains. A prime candidate technology for applications in industrial control and automation is the specification defined by IEEE 802.15.4 standard for the MAC and physical layers in a multi-hop wireless mesh network. However, the current IEEE 802.15.4-2006 standard fails to satisfy the stringent requirements for latency and reliability performance necessary for industrial deployments.

A number of MAC types are known, including carrier sense multiple accesses (CSMA), time division multiple access (TDMA), code division multiple access (CDMA), and frequency hopping (FH). Hybrid MAC types use a combination of CSMA, TDMA and FH.

The IEEE 802.15.4 standard specifies a physical layer and medium access control (MAC) for lower layers o a low-rate wireless personal area networks (LR-WPAN's). This standard is the basis for the ZigBee and MiWi specification, which offers networking solution for the upper layers, which are not covered by the standard.

The IEEE 802.15.4 standard offers fundamental lower network layers of a type of wireless personal area network (WPAN), which focuses on low-cost, low-speed ubiquitous communication between devices, in contrast with other, more end user-oriented approaches, such as Wi-Fi. The emphasis is on very low cost communications of nearby devices with little to no underlying infrastructure, intending to exploit this to lower power consumption even more.

Three approaches for accessing communication channels in wireless sensor networks have been commonly used. The first approach, called TDMA, partitions the time axis into slots, and then allocates these time slots to participating nodes for contention-free channel access. That approach is very useful in single-hop networks, such as wireless cellular phone systems, where network resources, such as time slots, channels, and communication signal power, etc., are managed by a central entity.

The central management approach is generally not very feasible and scalable for large multi-hop wireless sensor networks, where the channel condition can change frequently, routes can not be reliable, and the network topology can not be available. In such networks, managing network resources efficiently and keeping a central repository of resources' allocation updated is not a simple or feasible task.

More important, TDMA based systems lack the required flexibility to handle failed transmissions, which are common in wireless sensor networks, because of their inability to provide opportunities for retransmission. Moreover, because the time slots are generally allocated in a static non-adaptive manner, those systems are normally ill prepared to handle burst traffic. Some approaches delegate the responsibility of resource allocation in such networks to higher layers. That can result in two undesirable factors. First, the network becomes inefficient. The latency in responding to changes in a volatile operating environment, which wireless sensor networks normally operate in, makes the network less adaptive. Secondly, it makes the design of higher layers, including the application network designs, more difficult because of limited familiarity with the issues and problem related to the lower level network components.

A second approach, called CSMA, allows every node to try to access the channel whenever node needs to transmit a frame. The node, however, "listens" on the channel before starting transmission to ensure that the transmission will not interfere with an already transmitting node. This approach needs minimum degree of resource allocation. However, throughput is degraded due to collisions between transmissions.

A third approach for channel access and network resource management is to use a hybrid network that allows both the contention-based CSMA channel access as well as contention-free TDMA channel access by the use of a well-defined structure, called a MAC super frame. The traffic in the TDMA part is due to the frames transmitted by the nodes in their allocated time slots. The network traffic in the CSMA part is meant to satisfy the need for asynchronous communications, which are generated by management frames, requests for time-slot allocation, transmission of normal data frames, and retransmissions of failed TDMA data frames.

The channel access times are specified in the form of a MAC super frame and periodically announced in a beacon. Each full functional device (FFD) generally "owns" a super frame. The IEEE 802.15.4-2006 standard follows this hybrid approach.

FIG. 1 shows a super frame 160 according to the EEE 802.15.4 standard. The horizontal axis 105 indicates time. Each coordinator in the network periodically transmits a beacon 100. The beacon is used for synchronization and resource allocation. An interval between two consecutive beacons is a beacon interval 120.

The super frame includes a contention access period (CAP) 150 that uses CSMA, followed by a contention free period (CFP) that uses TDMA. The CFP 140 includes guaranteed time slots (GTS) 145. Each time slots 145 is allocated to a device that requires contention free access to the channel to minimize probability of collision of its transmission with other transmissions. Typically, the CFP is used for more important traffic that must get though in time.

The CAP 150 and the CFP 140 form the active portion 110 of the super frame 160, which is followed by a much longer inactive period 130. The inactive period can be used by other coordinators, while the coordinator device of this super frame is idle and 'listens' to the channel for transmissions by the other coordinators. A child coordinator 11 can start its super frame 170 during the inactive portion 130 of the super frame 160 of its parent coordinator 12. A leaf node communicates with its parent coordinator only during the active portion 110 of the super frame 160 of its parent coordinator 10. The inactive period can be several seconds.

However, the IEEE802.15.4-2006 standard fails to satisfy the performance requirements for industrial deployments, including scalability, reliability, and latency issues.

Moreover, it is desirable that frequency channel hopping should be used for a higher reliability and better channel efficiency. It is also desirable to allocate channels dynamically for retransmission of failed transmissions and additional channel access should be provided dynamically on demand in the same super frame in order to better handle sudden increase in data traffic.

SUMMARY OF THE INVENTION

Brief Description Of The Drawings

FIG. 12 is a block diagram of synchronizing among node.

DETAILED DESCRIPTION OF THE PREFERRED EMBODIMENTS

The embodiments of our invention provide a protocol that operates in a distributed manner in a network of transceiver nodes, and offers an automatic resource management mechanism that is distributed in its nature, and scalable. The protocol uses period announcement cycles to specify a communication schedule for the nodes.

The network offers a very reliable communication services. It offers low latency by providing opportunities for retransmission of failed data frames in the same super frame. It offers a certain degree of determinism in the sense that data frame will be delivered in the same super frame. That is, the super frame duration defines maximum transmission delay for one hop transmission. The network is adaptive to burst traffic in the sense that the nodes having unusual data arrivals can request for additional bandwidth from a coordinator node. This bandwidth is dynamically allocated in the same super frame. The protocol does not require assistance from higher layers in the network protocol stack for channel access management.

We first describe the super frame structure and then describe different configurations or scenarios in which the network can efficiently be used.

Super Frame Structure

A super frame specifies the times, modes of channel access, and the nodes that can access the channel and modes that can be used to access the channel.

Figure 1:
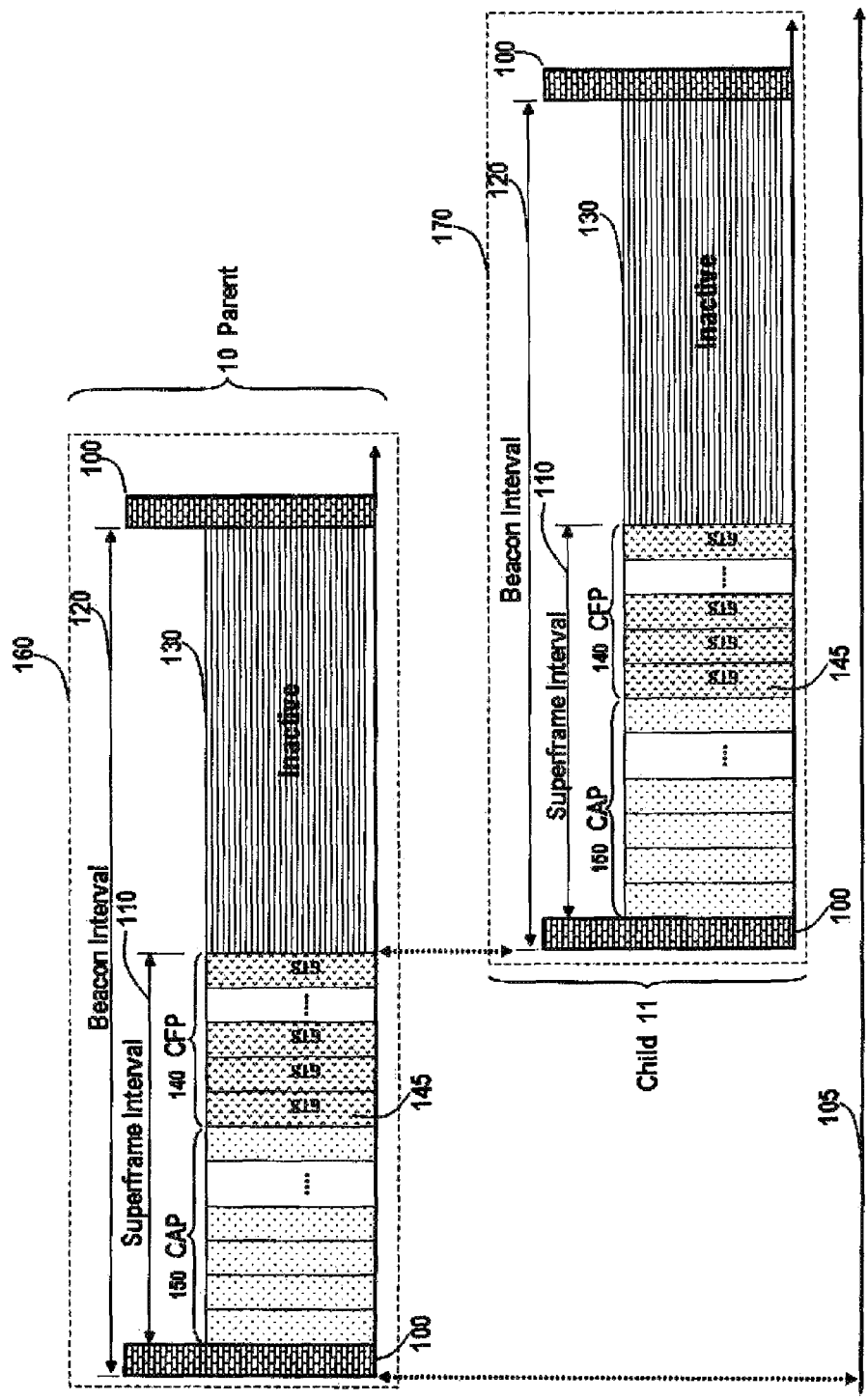
FIG. 1 is a block diagram of a conventional MAC frame structure according to the IEEE802.15.4-2006 standard.
Figure 2:
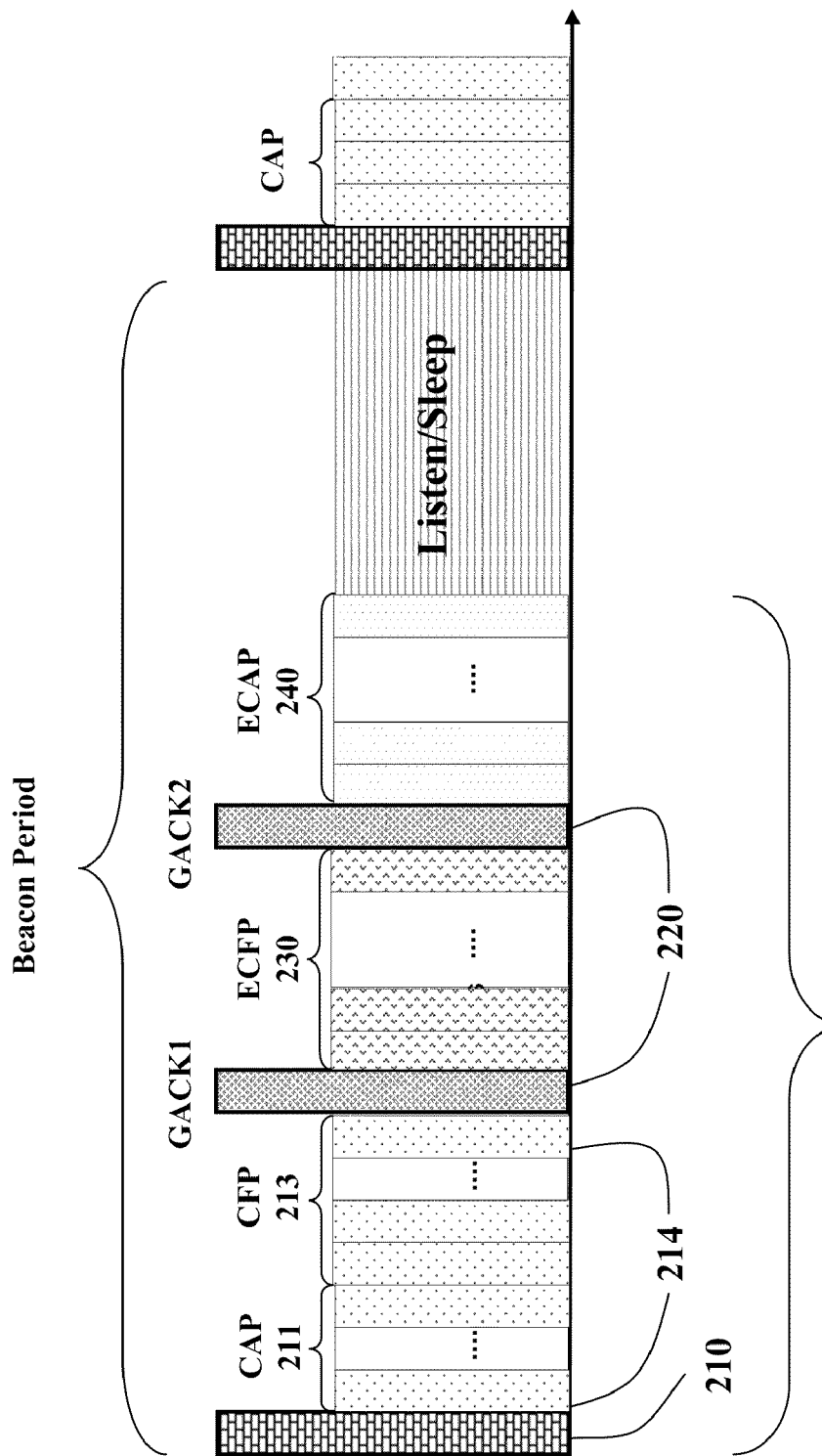
FIG. 2 is a block diagram of a MAC frame structure according to embodiments of the invention.

As shown in FIG. 2, the super frame 200 for one beacon period includes the following fields.

Beacon 210: The beacon is the first field transmitted in the super frame. The beacon identifies the owner node of that super frame, and can have additional information about the network and the owner node. It specifies the total length of the super frame, and the active period 211, starting times of contention access period (CAP) 212 and contention free period (CFP) 213 periods, and information on guaranteed time slots (GTS) 214. The beacon can also include channel hopping information. The beacon is also used for time synchronization with adjacent and child nodes with the transmitting coordinator node.

CAP 212: This period enables adjacent nodes to use contention-based CSMA/CA for channel access. During this period, nodes can transmit data frames to the coordinator node. Nodes can also transmit their requests for allocation of the GTS by the owner node of the super frame. In the CAP, the node can transmit their frames, subject to a successful channel access, without any prior permission from the coordinator node.

CFP 213: This period is the managed portion of a super frame. It is normally divided into time slots, which are allocated on demand to adjacent nodes. Because only one node is allowed to access the channel during any given time-slot, the channel access is almost always guaranteed. Therefore, these time-slots are also called GTS 214. The coordinator controls allocation of the time-slots in the super frame to requesting nodes.

The coordinator node can not individually acknowledge the GTS frames received. Acknowledging frames individually has significant overhead in terms of switching back and forth between Rx and Tax modes apart from the transmission overhead for the ACK frames. The transmitter node can indicate in its data frame header if it wants immediate acknowledgement of that frame. Otherwise, the acknowledgement is transmitted later as part of the group acknowledgement (GACK) frame 220. Also, the transmitter node can request for an additional GTS by setting a flag in the header of its GTS frame that it is currently transmitting. The additional GTS can be used to transmit more data frames in case, for example, the node has some burst data arrivals. The coordinator node can allocate one or more additional time-slots to the requesting node in an extended CFP (ECFP) 230 of the same super frame.

GACK1 (Group Acknowledgement 1): A GACK frame is transmitted by the coordinator after CFP terminates. The GACK frame contains a bit map that indicates which GTS transmissions were successfully received. The GACK frame also specifies the new GTS allocations in the ECFP for the failed GTS frames to be retransmitted by respective transmitter nodes. Also, the GACK frame can have information on allocation of additional bandwidth, i.e. time-slots in the ECFP, to requesting nodes for handling higher packet arrival rate.

ECFP (Extended CFP): This period includes zero or more time slots that have been allocated, as specified in the GACK1 frame, to the requesting nodes to try a retransmission of a GTS frame that failed to transmit in its originally allocated time-slot in CFP, and to transmit an additional data frame arrived due to burst data traffic. A node can request for one or more additional time slots in the ECFP while transmitting its data frame in CFP. If all the data frames were successfully transmitted in CFP and no node requested for additional GTS allocation, then ECFP is not needed.

GACK2 (Group Acknowledgement 2): This frame is similar to GACK1 frame and contains a bitmap to indicate which frames in ECFP were received successfully. It also indicates any new time-slots being allocated for a sub-sequent ECFP in the same super frame.

ECAP 240 (Extended Contention Access Period): This period is similar to CAP but is subject to availability of time in the super frame. If retransmitted, its duration is indicated by the coordinator in the GACK1 or the GACK2. Because the ECAP allows contention based channel access, nodes can participate in transmitting a request for GTS allocation, in the next super frame, or to transmit (or retransmit) a data frame.

Figure 3:
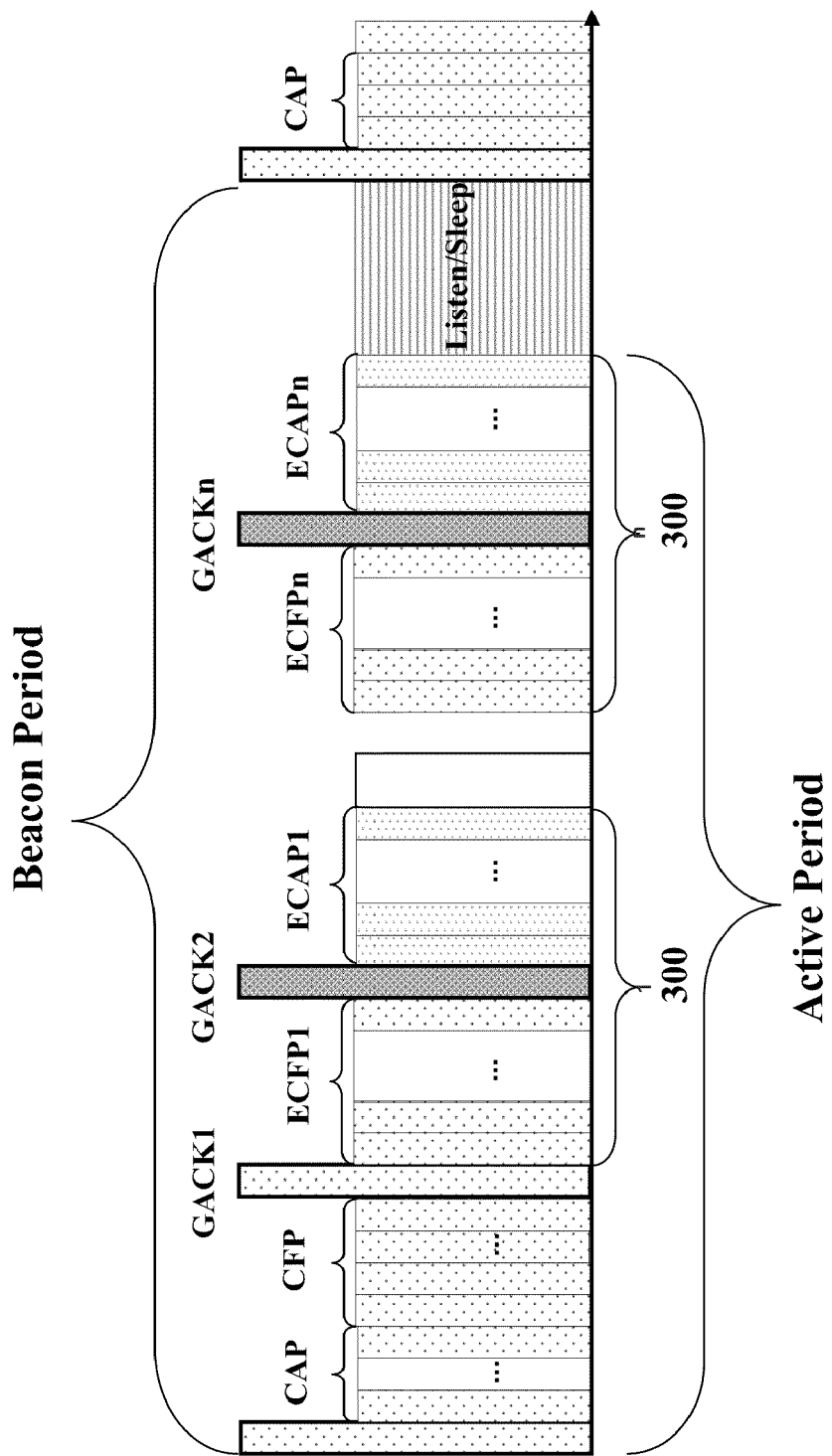
FIG. 3 is block diagram of an extended MAC frame structure with multiple ECFP, GACK2, and ECAP fields.

It needs to be pointed out that ECFP, GACK2, ECAP collectively make a group 300 of fields that can appear zero or more times in a super frame as shown in FIG. 3. In each such occurrence of this group, any one or two of the three members, i.e. ECFP, GACK2, and ECAP, can be present or missing.

All the above transmission must complete before the start of a next period, or the end of super frame.

All fields are optional with the condition that at least the CAP or CFP must be transmitted in every super frame. The beacon, which is transmitted by the coordinator just before the start of its super frame, indicates if the CAP or CFP is missing. If the CFP is present, the presence of the GACK1, ECFP, and GACK2 dynamically depends on the fact that if any GTS transmission failed and/or if any node requested for addition time slots. The presence of the ECAP depends on availability of free time in the super frame.

The size of the CAP, CFP, ECFP, and ECAP can vary from one super frame to the next, but all these periods are partitioned into time slots of equal size. The total number of these time slots in these periods and the slot size are fixed. The value for these configuration parameters is set when the coordinator starts.

Request for a GTS allocation made in CAP or CAP2 is meant for a time-slot allocated in the next super frame. The allocation can be temporary, and be effective for only a certain number of super frames, or it could be permanent. That is, the allocated node will use that same GTS in CFP forever. A node can later transmit a request to de-allocate a GTS currently allocated to it.

Network Deployment Scenarios

Now that we have described the structure of the MAC super frame, we describe how to effectively use this structure under different scenarios. For example, applications in factory automation require ultra-reliable communications with extremely low latency. Applications in industrial process automation, on the other hand, require high reliability but relax the requirements for latency. Other general-purpose applications, such as assets tracking, HVAC and climate control systems in buildings, and environmental monitoring have less stringent performance requirements for latency and reliability. Our super frame structure can satisfy the requirements for all these application spaces.

Clustered Wireless Sensor Networks

Extremely Low Latency and High Reliability

Because the applications in factory automation have the most demanding performance requirements from wireless sensor networks, only single hop wireless communications can adequately be supported.

Figure 4:
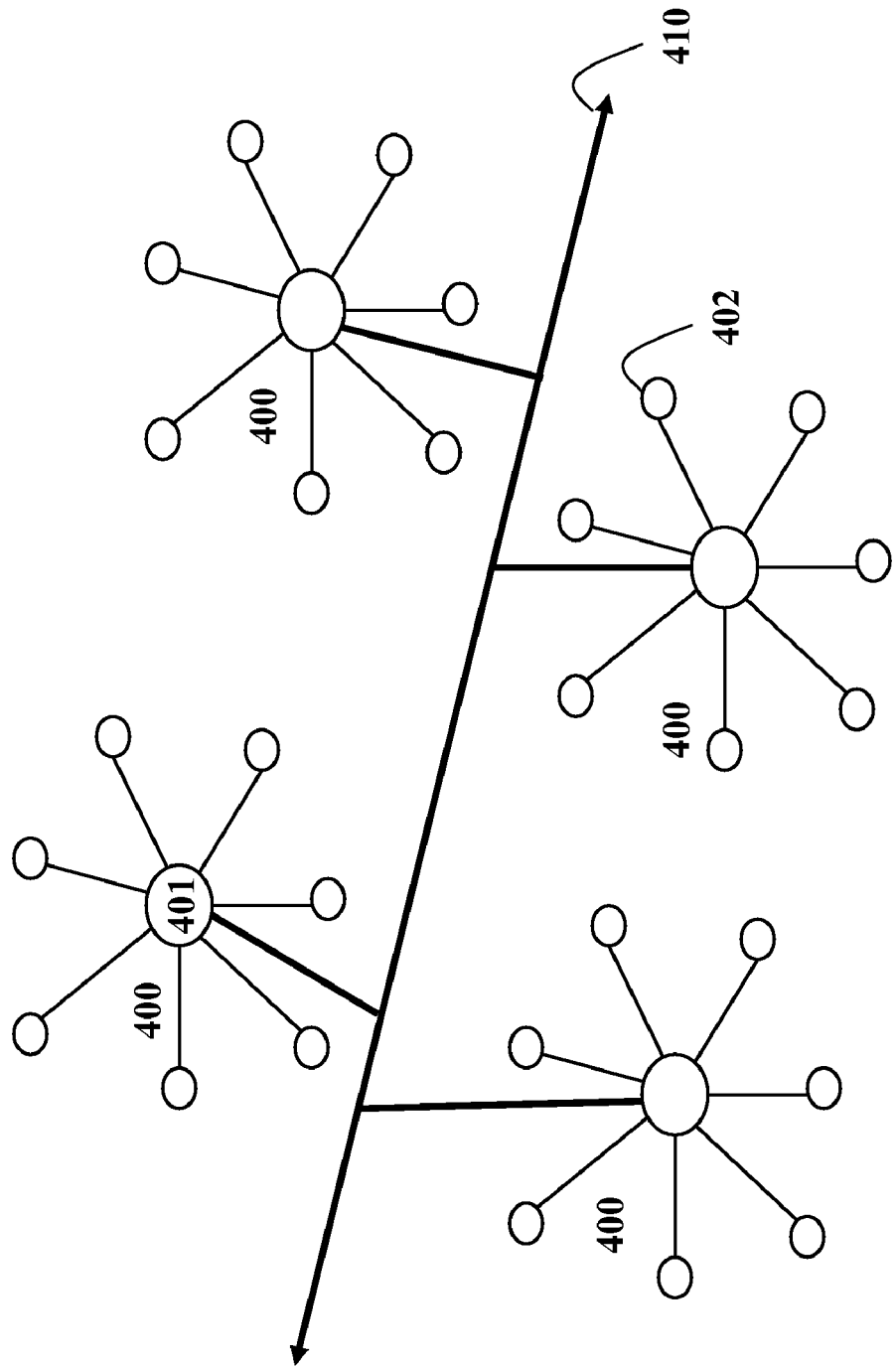
FIG. 4 is a schematic of a set of star networks that use the embodiments of the invention.

As shown in FIG. 4, a wireless sensor network can include a collection (four) of clusters 400, each having a central parent node 401, called cluster-head, and a set of wireless leaf nodes 402. All cluster-heads are connected to a high performance backbone wired 410, e.g., an Ethernet or wireless, such as IEEE 802.11x network, through access points. The cluster-head can be a dual stack device acting as an access-point to the backbone network. The embodiments of the invention allow the leaf nodes to simultaneously have multiple parent nodes in different clusters.

All wireless nodes in each cluster can communicate with their designated one or more cluster-head nodes, over one-hop wireless communication. Please note that a cluster can have more than one access points designated/available to the nodes in that cluster. Only one of them can be acting as a cluster-head.

A sensor node, on the other hand, can be associated with more than one cluster-heads. Each access point collects data from all sensor nodes in its associated cluster, possibly aggregates the received data, and forwards it on to the backbone network. Each cluster can be a star network independently from other clusters in the neighborhood or all clusters can be part of one logical wireless network, thus, sharing a single address space. In addition, all clusters can be operating on the same frequency channel or every cluster can be using different frequency channel to avoid collisions.

A third method of operation is to use frequency channel hopping in every cluster to diversify the channel usage and to offer more resistance to channel interference. In that case, nodes in every cluster can be following a local (to the cluster) or global channel hopping sequence. The channel hopping can be based on per time-slot or per field (i.e., CAP, CFP, ECFP, ECAP, etc.) or a mix of both. The cluster-head owns the super frame and acts as the coordinator for its cluster while all other nodes in the cluster act as the child nodes of the coordinator.

Our super frame structure allows mobile nodes, which is quite common in industrial environments. A node, for example, can move from one stage of assembly line to another one. The roaming node can disassociate (or log off) from its current cluster by transmitting a disassociation request to the cluster-head. After the node moves into the transmission range of another cluster, it waits for a beacon transmitted by the cluster-head of the new cluster.

After the node receives a beacon, the node synchronizes with the local super frame. Then, the node tries to transmit an association request to the cluster-head by transmitting asynchronous communication frame in a CAP or ECAP. It can try multiple times to associate if needed. It can request for a GTS allocation while joining the cluster or after joining it to transmit it sensor data more reliably in non-contentious CFP of the super frame. It can also request for additional time slots if it has accumulated more data during its roaming from one cluster to another.

Wireless Mesh Networks

Extremely High Reliability

These networks assume a mesh topology and can include many coordinator nodes, each having its own super frame. These nodes are some times called full functional devices (FFD), and sensor nodes, called reduced functional devices, which are generally leaf nodes in the network topology. The coordinator nodes can communicate with their child RFD nodes to collect sensor data or to transmit commands, as well as with the adjacent coordinator nodes for peer-to-peer communications.

That makes it necessary to define the scheduling mechanism as described herein. Every FFD node can have many RFD and FFD nodes as its child nodes. Mesh wireless networks generally allow multi-hop communications. That is, a data frame can travel from a source node to it destination node over multiple hops in the network.

Every coordinator (i.e. an FFD node) must be aware of the super frames of its neighbor FFD nodes with which it can communicate. It is not only needed to facilitate efficient peer-to-peer communications but also to avoid or minimize the interference in the communications during active periods of adjacent FFD nodes.

Figure 5:
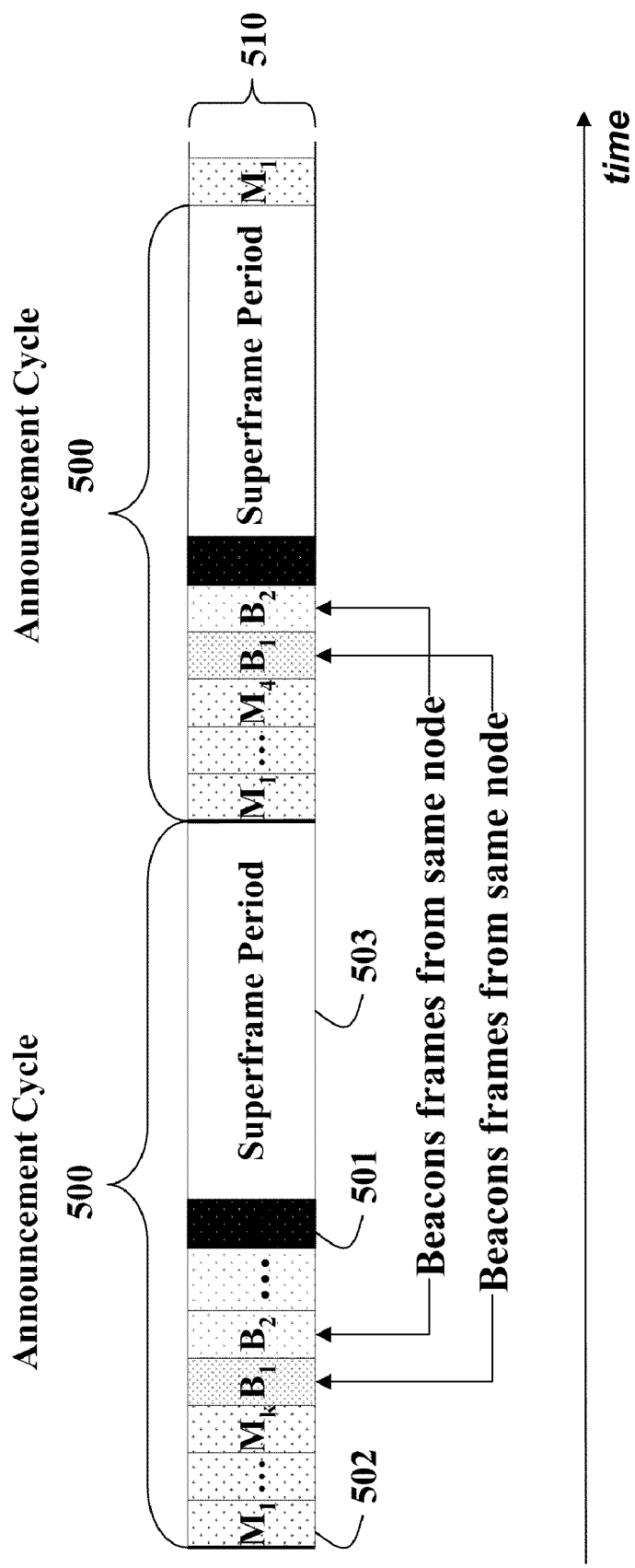
FIG. 5 is a block diagram of an announcement cycle according to embodiments of the invention.

As shown in FIG. 5, the invention uses a mechanism where all FFD nodes transmit their beacons $B_{an}$ 501 periodically by using beacon time slots on a predetermined announcement channel 510. This enables the FFD nodes to monitor and receive the beacons transmitted by adjacent nodes. In addition, the announcement channel can have several reserved management time slots $M_k$ 502 that can be used for management purposes such as announcement for reserving a beacon-slot by a node joining the network, or releasing a beacon-slot by a node leaving the network. In addition, the announcement channel 500 can also be used for making broadcast transmissions of super frame including data frames during a super frame period 503, as described below.

The time length of the announcement cycle can vary in different parts of the network. The minimum and maximum size for this cycle is configurable. The time slots are selected and reserved using a distributed process.

Scheduling of beacons on the announcement channel is not the focus of this invention. The announcement channel can be a fixed channel statically selected at the configuration or re-configuration of the networks. Alternatively, the announcement channel can periodically and systematically be changed to avoid the poor quality transmissions due to interference and other factors. A simple procedure can the change announcement channel every super frame to select a next channel from a list of good channels. This list can be constructed and updated in a distributed fashion.

After a node transmits its beacon on announcement channel, there are two possibilities.

Figure 6:
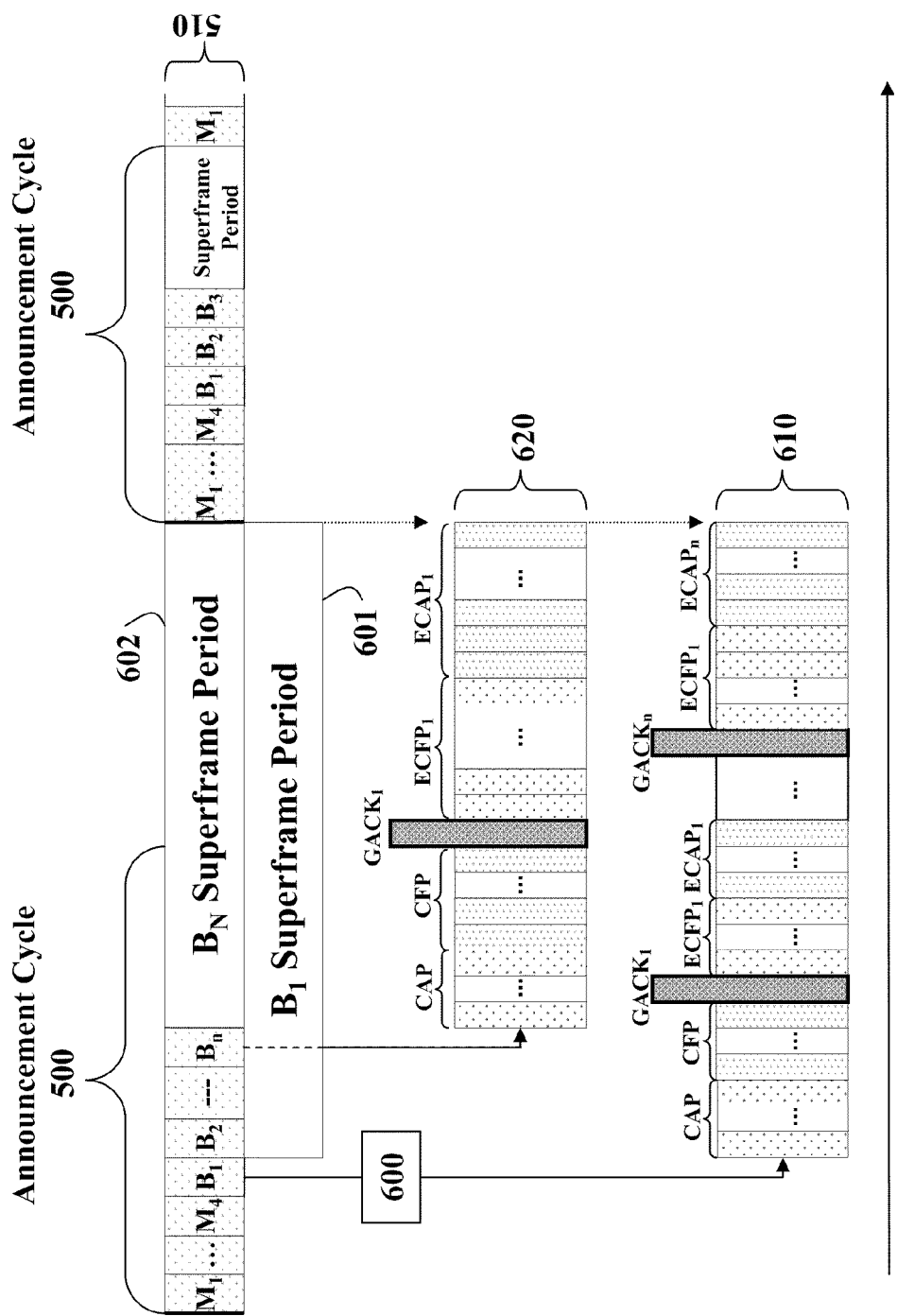
FIG. 6 is a block diagram of a super frame with channel switching.

As shown in FIG. 6, after the transmission of the beacon, e.g., $B_1$, the FFD node immediately switches 600 to another channel 610, and starts the active period of its super frame 601 during the super frame period 503 in such a way that there are no direct collisions with transmissions from another node on another channel 620. Note also that this super frame is longer than the super frame 602 for beacon $B_n$.

To do that, each node either uses a specific channel for its super frame, or the nodes follows a channel hopping sequence. In the former case, the channel is selected in a systematic way to ensure that two adjacent nodes select different channels. One way to do that is to select and reserve the channel during the beacon scheduling process.

Another way is for each node to monitor adjacent nodes for a sufficiently large period of time to select an unused channel. Another way is to select a channel with a good guess, and then change it if a collision is detected. If the network allows channel hopping, then the FFD node, right after transmitting its beacon, starts its active period by following the channel hopping sequence. This sequence must be pre-specified and known to the adjacent nodes so that those nodes can participate in communications with this node, that is, the node that is associated this super frame. Channel hopping can be based on per slot or per group of slots (e.g., per field such as CAP, CFP, ECFP, and ECAP) in the super frame.

With the above scheme, all nodes finish their communications before the start of the next Announcement Cycle. This scheme, however, allows the nodes to have super frames of different sizes. A node using beacon-slot B1, for example, can have longer super frame than the super frame of a node that uses B2 for its beacon transmission. Variable sized super frames enable more busy nodes, e.g., nodes closer to a data sink, to have a longer time for channel access.

FIG. 6 shows a deployment scenario where FFD nodes transmit their beacons in their allocated beacon-slots, and immediately switch 600 over to another channel 610, and start their super frame. Nodes can use channel hopping during the super frame. Also, some nodes can have longer super frame than others. The node that transmitted its beacon in beacon-slot B1 can have longer super frame than other nodes, which transmitted their super frame in B2, or later.

Figure 7:
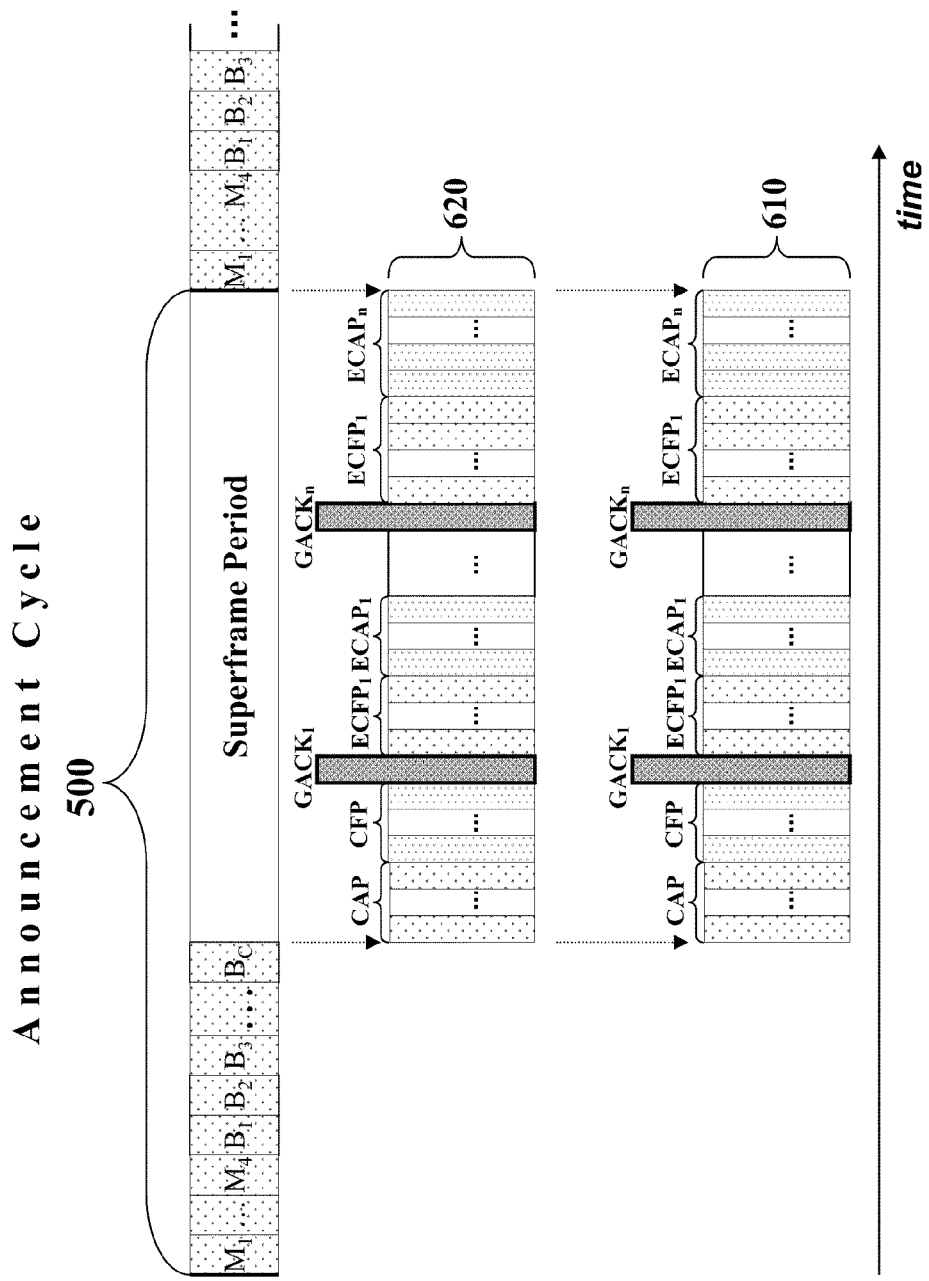
FIG. 7 is block diagram of simultaneous super frames.

In the other possibility, as shown in FIG. 7, every FFD node waits after transmitting its beacon until all adjacent FFD nodes also transmit their beacons. All nodes then start the active period of their super frame simultaneously on different channels.

This allows all nodes to receive beacons from all adjacent nodes, to obtain information on their super frames with which the node can communicate during the current super frame period. The super frame of all nodes completes before the start of next announcement cycle. Unless a node is transmitting a management frame, all nodes listen during the management slots 502 (M1-M4). Similarly, all nodes also listen for beacons 501 from adjacent nodes. All nodes start their super frame simultaneously. Each node uses a different channel or follows a channel hopping sequence. Peer nodes communicate with the owner node by using CAP, CFP, ECEP or ECFP. Minimal or no intervention from higher layers is needed for channel and GTS allocations After a node is able to receive the beacon from an adjacent node, it is possible to perform peer-to-peer communications with other nodes. An FFD node can also communicate with its own (possibly sleeping) child nodes during its own active period. A peer FFD node or a child RFD node can transmit a request during CAP or ECAP for a GTS allocation.

Alternatively, a node can decide to transmit a data frame during CAP or ECAP to the owner FFD node. Because CSMA/CA is used in channel access in CAP and ECAP, the transmission can fail due to collisions. If a request for GTS allocation is successfully transmitted, the receiving FFD node can allocate GTS to the requesting node and announce it in the next beacon.

The time length of the announcement cycle can vary in different parts of the network. The minimum and maximum size for this cycle is configurable. Beacon time slots are selected using a distributed process. The first several time slots are used for management messages 502 and broadcasts. CSMA/CA is used for channel access during this time.

Figure 8:
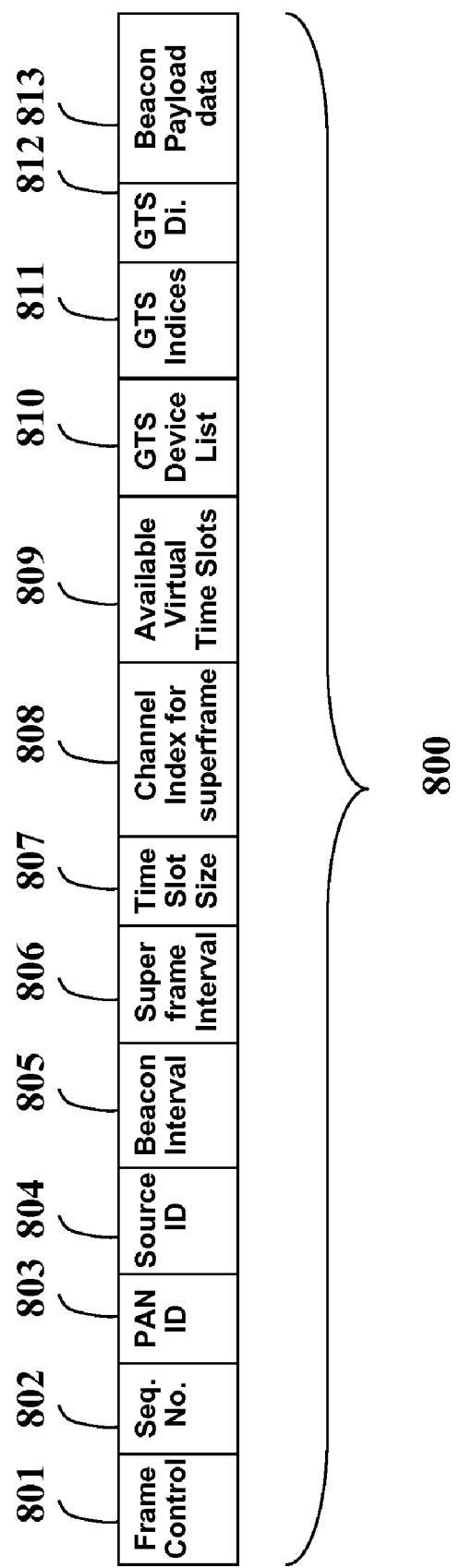
FIG. 8 is a block diagram of a beacon used by embodiments of the invention.

FIG. 8 shows the field of 801-812 a beacon 800, respectively:

Frame Control 801: As defined in IEEE802.15.4 specification;

Sequence Number 802: Indicates the serial number of the beacon being transmitted. It is incremented by one after the transmission of every beacon;

PAN ID 803: Identifies the PAN;

Source ID 804: Contains the address of the node that is transmitting the beacon;

Beacon Interval 805: Specifies the time interval between the consecutive beacons by a node;

Super frame Interval 806: Specifies the length of active period of the super frame. This field must be less than or equal to beacon interval in length;

Time-Slot Size 807: Specifies the size in milliseconds of each time-slot in the super frame. The length of active period in the super frame, as specified by Super frame Interval, divided by the time-slot size gives the total number of time-slots in the super frame. That is in contrast with IEEE 802.15.4 spec, where number of slots is fixed to sixteen;

Channel Index 808: Specifies the hopping sequence to be followed for communications during the super frame;

Available Virtual Time-Slots 809: This field specifies the total number of time-slots in the super frame. This field is used only if the active period has extended length than the one specified by Super frame Interval parameter;

GTS Device List 810: Specifies a list of nodes that have been allocated guaranteed time-slot in CFP or ECFP;

GTS Indices 811: Specifies the boundaries of allocated GTS to neighboring nodes in the same order as in the device list;

GTS Directions 812: Specifies if an allocated GTS will be used for Rx or Tax by the owner coordinator node;

Beacon Payload Data 813.

Only the basic fields in this frame have been listed here. However, more fields can be included in the beacon if, and when needed. The IEEE 802.15.4 standard beacon offers several other fields that can be utilized too.

Figure 9:
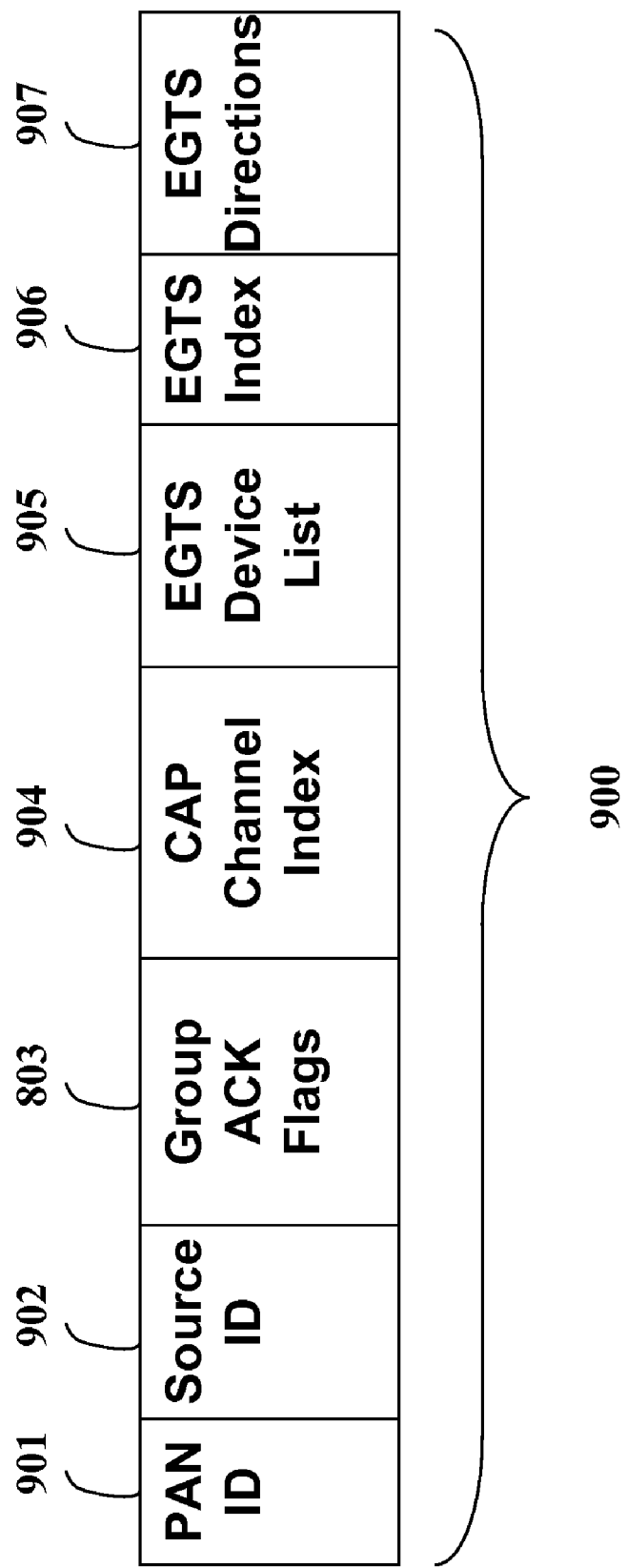
FIG. 9 is a block diagram of a GACK used by embodiments of the invention.

FIG. 9 shows a GACK frame including the following fields 901-901:

PAN ID 901: Identifies the PAN of the transmitting node;

Source ID 902: Identifies the transmitting node;

Group ACK Flags 904: It is a bitmap that indicates the status of GTS frames received by the coordinator node during CFP or ECFP;

CAP Channel Index 904: Specifies the hopping sequence to be followed in the following ECAP if existing. A GACK frame may or may not be followed by the ECFP. Moreover, an ECAP may follow ECFP or GACK frame (if ECFP does not exist). If the ECAP does not exist, CAP Channel Index field will not exist. If ECAP exists but CAP Channel Index field is missing, the hopping sequence specified in the beacon will be followed;

EGTS Device List 905: Specifies the neighbor nodes that have been allocated a time-slot in ECFP;

EGTS Index 906: Specifies the time-slots that have been allocated to nodes in the same order as followed in the device list field; and EGTS Directions 907: Specifies if the coordinator will receive or transmit a data frame during each allocated EGTS.

The following example procedure can be used to obtain a beacon-slot. Before joining the PAN, a node scans the network for a sufficient amount of time to determine the size of the announcement cycle, and determines empty or otherwise available beacons slots 501. The node determines which channel is good for its data communications, and obtains a Neighbor Group (NG) of each of its neighboring nodes.

The node constructs an Extended Neighbor Group (ENG) from the received Nags. The node selects the lowest empty slot available in its ENG, and transmits its selected slot in a management frame of the next announcement cycle. The node also declares the channel the nodes will use for its super frame.

Figure 10:
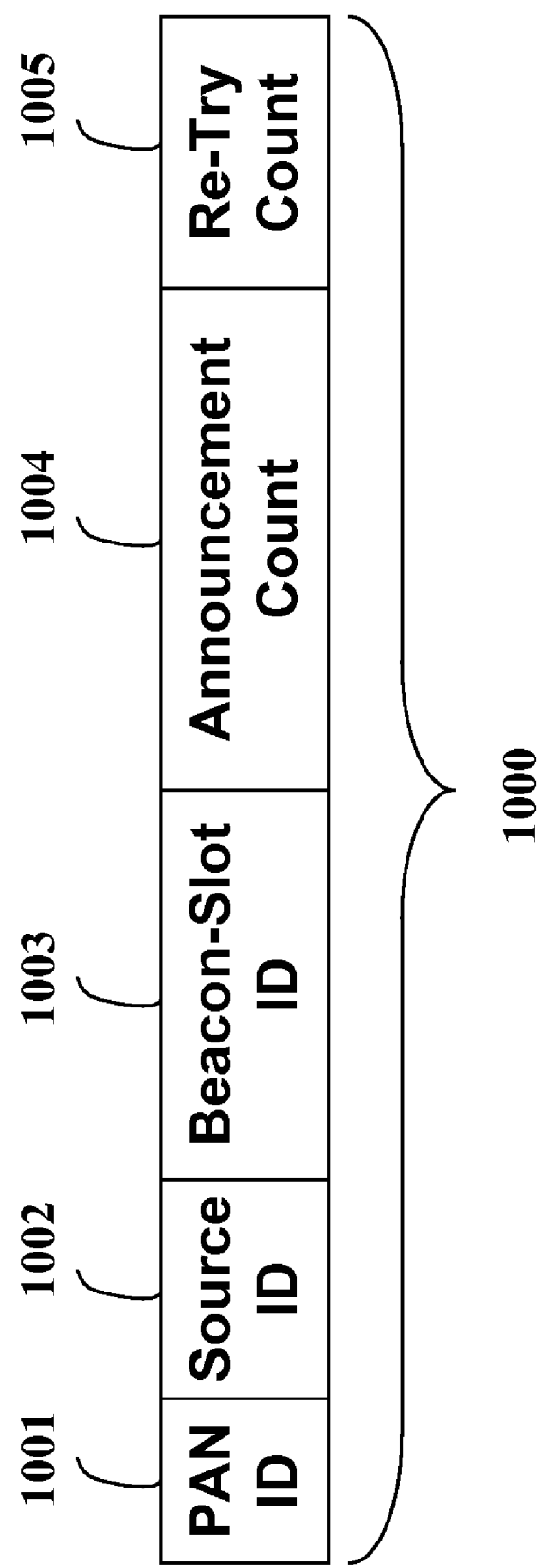
FIG. 10 is a block diagram of a Beacon-Slot Request frame used by embodiments of the invention.

FIG. 10 now shows the structure of Beacon-Slot Request frame 1000, which is used by a node to announce its intention to reserve and use a particular beacon time slot in the announcement cycle for transmitting its beacons. The frame includes:

PAN ID 1001 and Source ID 1002 for identifying the PAN and the transmitting node;

The Beacon-slot ID 1003 specifies the slot number Bi that the announcing node intends to occupy for its beacons;

Announcement count indicates that how many times the announcement for the beacon $B_i$ has already been made. A node may be required to make the announcement "k" times, where $k \geq 1$, before the node starts using the beacon $B_i$. The value of k may be a configuration parameter; and Re-Try Count specifies that how many other beacon-slots were unsuccessfully tried by this node. After the node fails to reserve a beacon time slot $B_i$ 501 for any reason, the node attempts to reserve another beacon time slot by, while incrementing the re-try count in its announcement frame.

Either or both of the above two counters, can be used to prioritize one node over other nodes in case of contention.

The "announcing" node, after making its announcement, listens the remaining management slots and all beacon frames in the current announcement cycle.

Figure 11:
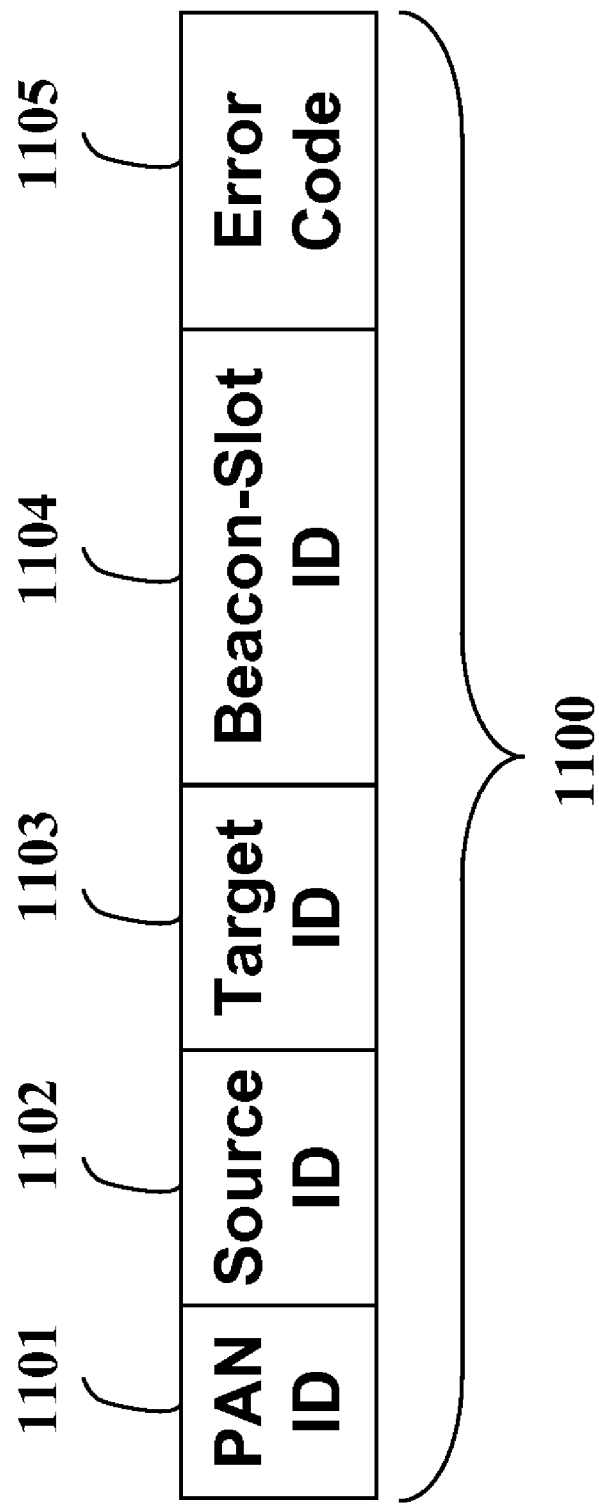
FIG. 11 is a block diagram of a Beacon-Slot Response frame used by embodiments of the invention.

FIG. 11 shows the frame structure of Beacon-Slot Response frame 1100 that is transmitted by a node $N_s$ in response to the Beacon-Slot Request frame sent by another node $N_r$. The frame is used to indicate that an attempt by node $N_r$ to reserve the beacon-slot, as specified in its Beacon-Slot Request frame, will cause a problem for the network. This frame is transmitted during the management slots $M_i$. The frame includes:

PAN ID 1101 and Source ID 1102 to identify the PAN and the transmitting node;

Target ID 1103 is the address of that node that previously transmitted a Beacon-Slot Request frame;

Beacon_slot ID 104 specifies the slot number $B_i$ that the announcing node intended to reserve for its beacons; and Error Code 1105 to specify the reason why the occupation of requested beacon-slot will cause the problem.

If a node sees a problem in a Beacon-Slot Request frame, it has two options to inform the announcing node of that problem. One is to use Beacon-Slot Response frame as described above. Another option is to use its beacon frame to convey the error code to announcing node. Target ID, Beacon-Slot ID, and Error Code can be included in the beacon payload field 813 of the beacon frame 800.

Figure 12:
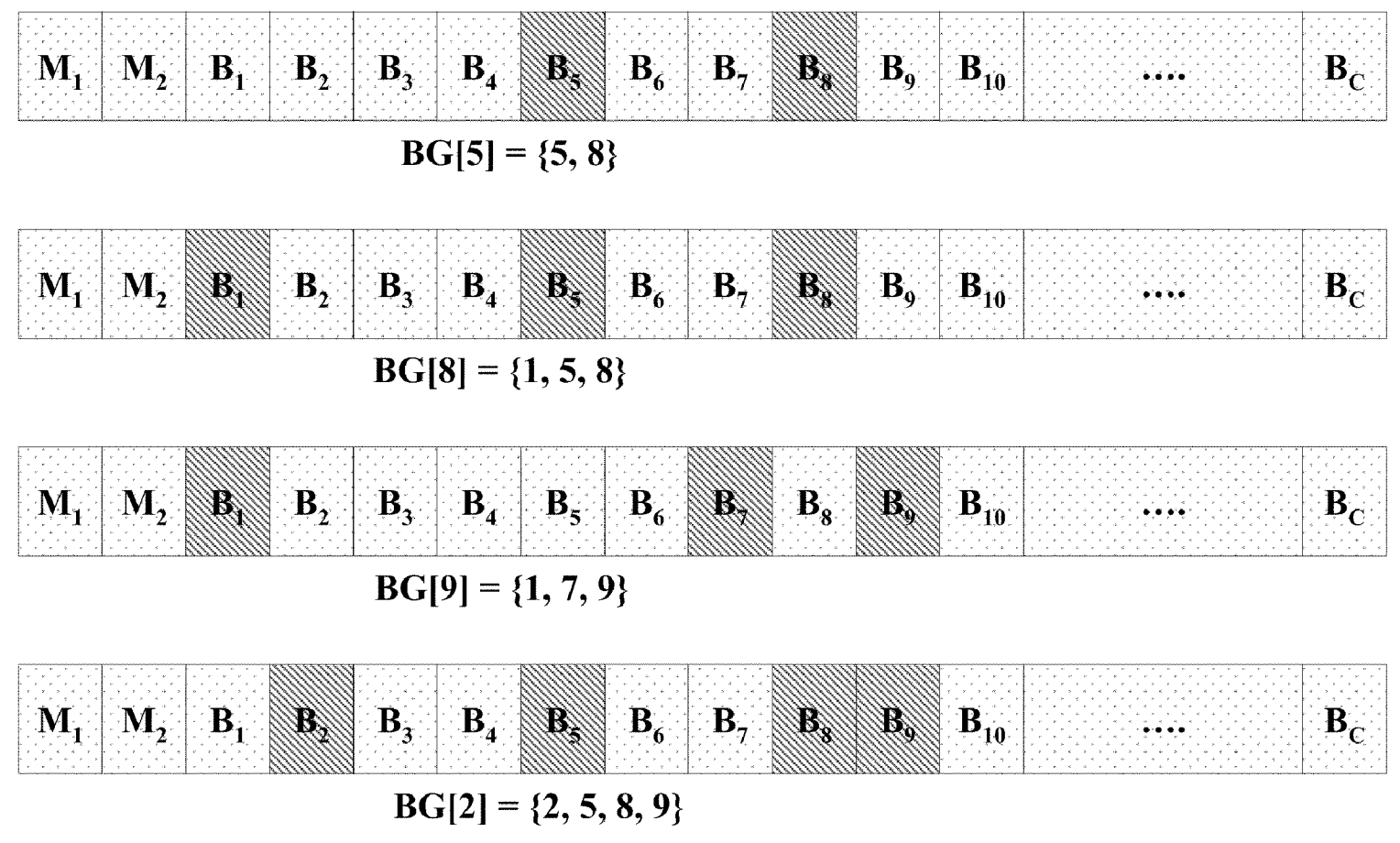

FIG. 12 shows the synchronization among the nodes. It is noted that not all beacon-slots can be used in any area. Nodes can not observe any activity during some beacon-slots. The node transmitting its beacon in slot $B_5$, for example, observes wireless activity in beacon-slot $B_8$ only. The node that transmits its beacon in $B_8$ slot received beacons from other nodes only in $B_1$ and $B_5$. Similarly, the node that transmits its beacon in beacon-slot $B_2$ receives beacons in slots $B_5$, $B_8$, and $B_9$ only. That allows beacon-slots to be used by different nodes simultaneously if they are out of radio range from each other.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for communicating in a wireless network including a plurality of nodes, comprising:
   partitioning each periodic announcement cycle of a communication schedule into a set of time slots, including a set of management time slots, a set of beacon time slots, and a set of superframe time slots;
   broadcasting management frames during the management slot, wherein the management frames specify beacons;
   broadcasting the beacons during the beacon-slots, wherein the beacons specify superframe; and
   transmitting the superframes during the superframe time slots.

2. The method of claim 1, wherein the network includes a plurality of star networks, and wherein each star network includes a central parent node and a plurality of leaf nodes, and wherein the central nodes are a wired backbone.

3. The method of claim 2, wherein a particular leaf node simultaneously has multiple central parent nodes.

4. The method of claim 1, wherein the leaf nodes include sensors, and the central nodes aggregate data acquired by the sensors.

5. The method of claim 1, wherein the transmitting uses frequency channel hopping.

6. The method of claim 1, wherein the network includes mobile nodes.

7. The method of claim 1, wherein the broadcasting and transmitting uses an announcement channel.

8. The method of claim 1, wherein the transmitting uses a channel that is different than the announcement channel.

9. The method of claim 1, wherein a time length of the announcement cycle can vary in different parts of the network.

10. The method of claim 1, wherein the time slots are selected and reserved using a distributed process.

11. The method of claim 1, wherein a time length of the announcement cycle varies dynamically.

12. The method of claim 1, wherein the nodes start transmitting the superframes simultaneously after a last beacon time slot in the announcement cycle, and the nodes use different channels or a channel hopping sequence.

13. The method of claim 1, wherein the superframes have different sizes.

14. The method of claim 1, wherein the beacon includes a field for specifying a size of superframe time slots.

15. The method of claim 1, wherein the beacon includes a field for specifying a channel index for the superframes.

16. The method of claim 1, wherein the beacon includes a field for beacon payload data.

17. The method of claim 1, wherein the management frames include a Beacon-Slot Request, which is used by a particular node to announce an intention to reserve and use a particular beacon time slot.

18. The method of claim 17, wherein the management frames include a Beacon-Slot Response frame, which is used to indicate that the intention to use and reserve will cause a problem for the network.

19. The method of claim 1, wherein the superframe time slot includes guaranteed time slots (GTS) for transmitting GTS frames, and wherein in the GTS frames include additional data frames.

20. The method of claim 1, wherein the superframe includes an indication whether the superframe is to be acknowledges immediately after being received.

21. The method of claim 1, wherein the network has a mesh topology for communicating with the nodes via multiple hops.

22. The method of claim 1, wherein resource of the network are allocated in a distributed manner.

23. The method of claim 22, wherein the resources include time and frequencies.

* * * * *